(12) United States Patent
Pruitt et al.

(10) Patent No.: US 11,840,894 B1
(45) Date of Patent: *Dec. 12, 2023

(54) METHOD AND DEVICE FOR CONNECTING TO A CONDUCTOR PIPE

(71) Applicant: PRUITT TOOL & SUPPLY CO., Fort Smith, AR (US)

(72) Inventors: Grant Pruitt, Fort Smith, AR (US); Cris Braun, Van Buren, AR (US)

(73) Assignee: PRUITT TOOL & SUPPLY CO., Fort Smith, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/541,952

(22) Filed: Dec. 3, 2021

Related U.S. Application Data

(63) Continuation of application No. 16/657,306, filed on Oct. 18, 2019, now Pat. No. 11,193,337, which is a continuation of application No. 15/357,665, filed on Nov. 21, 2016, now abandoned.

(51) Int. Cl.
| | | |
|---|---|---|
| *F16L 21/00* | (2006.01) | |
| *E21B 17/04* | (2006.01) | |
| *E21B 19/16* | (2006.01) | |
| *E21B 33/038* | (2006.01) | |

(52) U.S. Cl.
CPC .............. *E21B 17/04* (2013.01); *E21B 19/16* (2013.01); *E21B 33/038* (2013.01); *F16L 21/00* (2013.01)

(58) Field of Classification Search
CPC ... F16L 13/02; F16L 13/0218; F16L 13/0236; F16L 13/0245; F16L 13/0281; F16L 13/0209; F16L 21/002; F16L 21/08; F16L 21/02; F16L 37/12; F16L 47/02; F16L 47/03; F16L 47/08; F16L 47/12; F16L 47/32; F16L 25/06; F16L 25/065; F16L 25/08; F16L 37/086; F16L 25/12
See application file for complete search history.

(56) References Cited

U.S. PATENT DOCUMENTS

| | | | |
|---|---|---|---|
| 2016/0245449 A1* | 8/2016 | Wolff | F16L 21/08 |
| 2016/0273688 A1* | 9/2016 | Considine, Jr. | F16L 37/14 |

* cited by examiner

*Primary Examiner* — Aaron M Dunwoody
(74) *Attorney, Agent, or Firm* — Schrantz Law Firm, PLLC; Stephen D. Schrantz

(57) ABSTRACT

The connector body attaches to the bowl for a rotating head assembly. The connector body welded to the bowl secures the conductor pipe to the bowl. An inner aperture of the connector body accepts the bowl and the conductor pipe. Fasteners insert into the connector body to secure the conductor pipe within the connector body. An attachment shoulder that extends inward from the outer wall narrows the inner aperture. The bowl rests on top of the attachment shoulder. The bowl inserts vertically downward into an upper opening of the connector body to the attachment shoulder. The conductor pipe inserts into a lower opening of the connector body. The fasteners insert radially into the connector body to secure the conductor pipe within the connector body. The attachment shoulder limits movement of the bowl and the conductor pipe within the inner aperture of the connector body.

19 Claims, 7 Drawing Sheets

METHOD AND DEVICE FOR CONNECTING TO A CONDUCTOR PIPE

CROSS-REFERENCE TO RELATED APPLICATIONS

This application claims priority to and is a continuation of U.S. patent application Ser. No. 16/657,306 entitled METHOD AND DEVICE FOR CONNECTING TO A CONDUCTOR PIPE filed on Oct. 18, 2019 which is a continuation of U.S. patent application Ser. No. 15/357,665 entitled METHOD AND DEVICE FOR CONNECTING TO A CONDUCTOR PIPE filed on Nov. 21, 2016, which is now abandoned, that are hereby incorporated by reference.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

1. Field of the Invention

In well drilling, with a rotary drilling rig, the drill bit and drilling pipe receive rotary motion from power equipment located on the surface. Below the drilling floor, at the ground surface, an assembly known as a rotating head allows the circulation of various fluids used in the drilling. The present invention relates to a device and method for securing the bowl to the conductor pipe. The present invention relates more particularly to a connector that enables the ease of use for the end user and also a more efficient method of assembly and disassembly to decrease down time caused by assembling or disassembling the rotating head and to decrease drilling costs.

The present invention enables attachment of the bowl to the conductor pipe without requiring welding the bowl directly to the conductor pipe. Avoiding welding for attaching the bowl to the conductor pipe reduces the time needed to secure the bowl to the conductor pipe. Instead, the user simply tightens fasteners on the connector body to secure the connector body to the conductor pipe. To remove the bowl, the user simply loosens the fasteners to disconnect the connector body from the conductor pipe.

Securing the bowl to the conductor pipe via the connector body removes the need to weld the bowl to the conductor pipe. The user simply tightens the fasteners to attach the bowl. The fasteners also eliminate the need of cutting the bowl from the conductor pipe. Such attachment reduces the time needed to install and remove the bowl from the conductor pipe.

Present day drilling operations are extremely expensive, and an effort to increase the overall efficiency of the drilling operation while minimizing expense requires essentially the continuous operation of the drilling rig. Drilling operations must be suspended while users replace the equipment. Thus, it is imperative that downtime be minimized.

In this regard, there is a need for improved attachment of the bowl to the conductor pipe. There is also a need to eliminate the need to weld the bowl to the conductor pipe and cut the bowl from the conductor pipe.

II. Description of the Known Art

Patents and patent applications disclosing relevant information are disclosed below. These patents and patent applications are hereby expressly incorporated by reference in their entirety.

These shortcomings are overcome by the invention disclosed herein. Accordingly, it would be desirable to provide an improved device and system for installing and removing the bowl from the conductor pipe.

SUMMARY OF THE INVENTION

The connector body of the present invention attaches to the bowl for a rotating head assembly. The rotating head assembly secures within the bowl. The bowl secures to the conductor pipe. Traditionally, the bowl is welded to the conductor pipe. Welding the bowl directly to the conductor requires that the weld occur at the drilling site. Such welding requires that the drilling operation cease while the bowl is welded onto the conductor pipe.

The connector body of the present invention welds onto the bowl. The welding of the connector body to the bowl can occur away from the drilling site and the rig. The connector body removes the need to weld the bowl directly to the conductor pipe. Therefore, attachment of the bowl to the conductor pipe via the connector body eliminates the need to weld the bowl to the conductor pipe at the drilling site or on the rig.

The connector body provides an attachment shoulder that extends radially inward. The bowl rests on top of the attachment shoulder. The bowl inserts vertically downward into the connector body to the attachment shoulder. The connector body is secured to the bowl. In one embodiment, the connector body is welded to the bowl.

The bowl with connector body attached is then placed on top of the conductor pipe. The conductor pipe inserts into the connector body. The attachment shoulder restricts the conductor pipe from travelling through the connector body. Seals, such as O-rings, placed within sealing grooves of the connector body seal the space between the connector body and the conductor pipe.

The user then tightens the fasteners into the connector body. Tightening the fasteners secures the connector body to the conductor pipe. The connector body secures the bowl onto the conductor pipe by tightening the fasteners onto the conductor pipe. The connector body releases the bowl from the conductor pipe by loosening the fasteners and removing the connector body from the conductor pipe.

The present invention reduces the downtime of the drilling rig by reducing time expended installing and removing the bowl. Known rotating heads require a user to weld the bowl onto the conductor pipe at the drilling site. To remove the bowl, the user must cut the bowl from the conductor pipe. Time spent welding and cutting for installation and removal of the bowl increases downtime and reduces productivity. Thus, known rotating heads increase downtime of the drilling and reduce the operating time of the drilling rig to increase expenses of the drilling operation.

The present invention reduces the time spent installing the bowl. The connector body is welded to the bowl prior to being placed on the conductor pipe. Such welding prior to placement on the conductor pipe provides a method of attaching the bowl to the conductor pipe without welding at the drilling operation site. The connector body eliminates the need to weld the bowl and the connector body to the conductor pipe. Eliminating such a welding step reduces the amount of time required to install the bowl on the conductor pipe.

The fasteners secure the connector body to the conductor pipe. Removing the bowl from the conductor pipe simply requires loosening the fasteners. Loosening the fasteners simplifies the process of removing the bowl from the conductor pipe. Such fasteners eliminate the need to cut the bowl from the conductor pipe.

Other objects, features, and advantages of the invention will be apparent from the following detailed description taken in connection with the accompanying drawings.

It is an object of the present invention to provide an improved attachment of the bowl to the conductor pipe.

Another object of the present invention is to allow more efficient attachment and removal of the bowl from the conductor.

Another object of the present invention is to prepare the bowl for attachment to the conductor pipe away from the conductor pipe.

Another object of the present invention is to reduce the time required to attach the bowl to the conductor pipe.

Another object of the present invention is to simplify the process of attaching the bowl to the conductor pipe.

Another object of the present invention is to create a safer work environment for rig personnel.

Another object of the present invention is to simplify the method of assembly of the rotating head assembly.

Another object of the present invention is to prevent unnecessary wear and damage to the conductor pipe.

In addition to the features and advantages of the method and device for connecting to a conductor pipe according to the present invention, further advantages thereof will be apparent from the following description in conjunction with the appended drawings.

These and other objects of the invention will become more fully apparent as the description proceeds in the following specification and the attached drawings. These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

Figure 1:
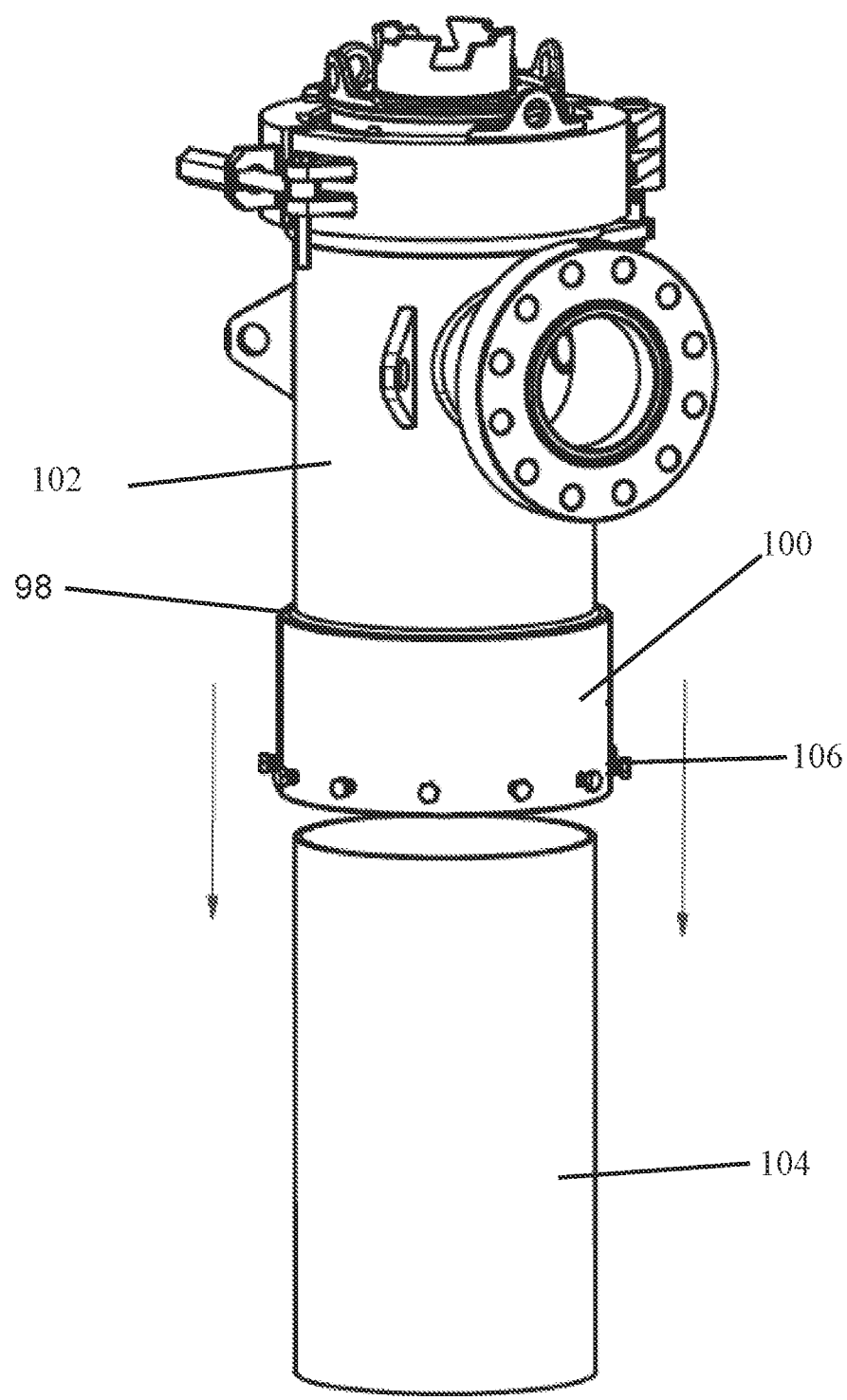
FIG. 1 is an environmental view showing one embodiment of the present invention.
Figure 2:
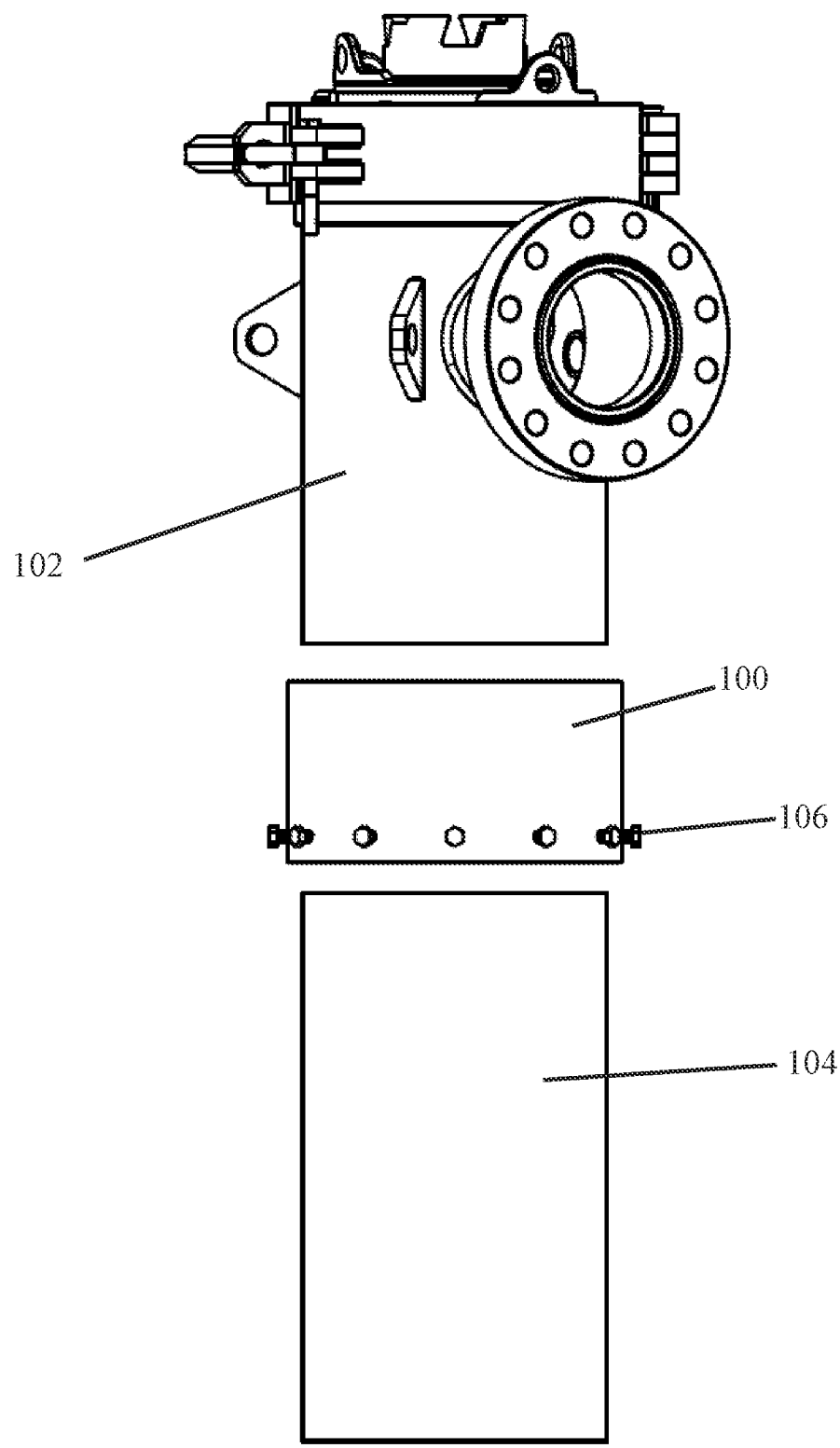
FIG. 2 is an exploded view thereof.

Referring to FIG. 1, the connector body of the present invention is generally illustrated by reference numeral 100. The connector body 100 attaches to the bowl 102. The bowl 102 remains fixed such that the bowl 102 does not rotate. Similarly, the connector body 100 does not rotate. The connector body 100 fixedly attaches to the conductor pipe 104. The conductor pipe 104 runs downhole to enable the drilling operation.

Figure 7:
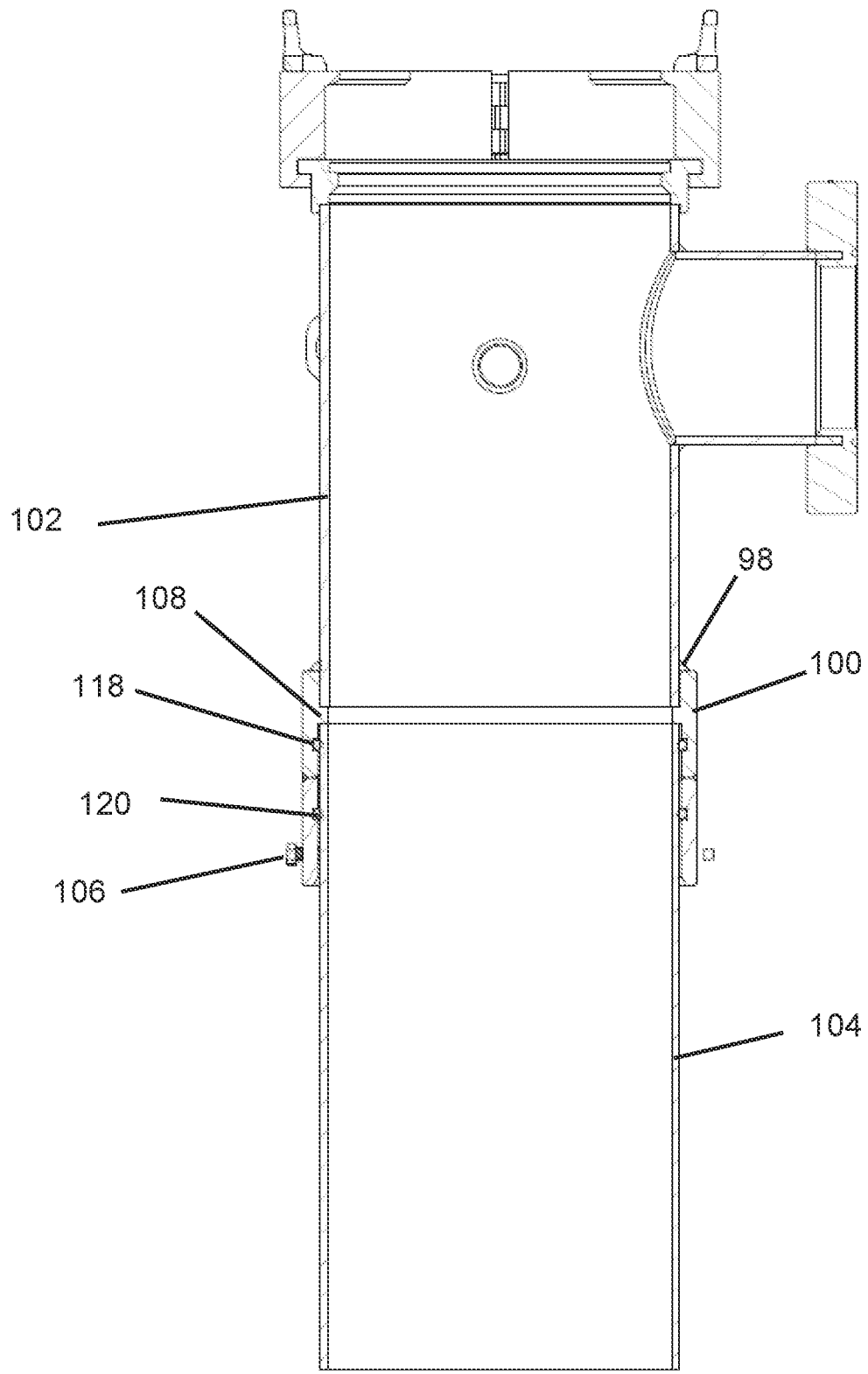
FIG. 7 is a sectional view thereof.

Fluids flow through the conductor pipe 104 during the drilling operation. The connector body 100 attaches to the conductor pipe 104 to secure the bowl 102 to the conductor pipe. In one embodiment, the connector body 100 is welded to the bowl 102. The bowl 102 of one embodiment is welded onto the connector body 100 at weld 98 as shown in FIGS. 1 and 7. The connector body 100 may be attached to the bowl 102 by other methods as well. The bowl 102 and connector body 100 are placed on top of the conductor pipe 104.

The conductor pipe 104 inserts into the connector body 100. At least one seal within the connector body 100 contacts the conductor pipe 104 to seal between the connector body 100 and the conductor pipe 104. In one embodiment, two or more seals are placed within the connector body 100 for sealing the attachment between the connector body 100 and the conductor pipe 104.

Fasteners 106 secure the connector body 100 to the conductor pipe 104. The fasteners 106 tighten and loosen within the connector body 100. Tightening the fasteners 106 within the connector body 100 secures the connector body 100 to the conductor pipe 104. The fasteners 106 frictionally engage the conductor pipe 104 to secure the connector body 100 onto the conductor pipe 104.

The user loosens fasteners 106 to disengage the fasteners 106 from the conductor pipe 104. The user can then remove the connector body 100 from the conductor pipe 104 after loosening at least a few of the fasteners 106.

In one embodiment, twelve (12) fasteners 106 are implemented in the connector body 100. The fasteners 106 secure the connector body 100 to the conductor pipe 104. The fasteners 106 insert radially inward from the connector body 100. The fasteners 106 insert radially into the connector body 100 to contact the conductor pipe 100. The contact between the fasteners 106 and the conductor pipe 104 secures the bowl 102 and connector body 100 to the conductor pipe 104.

Figure 3:
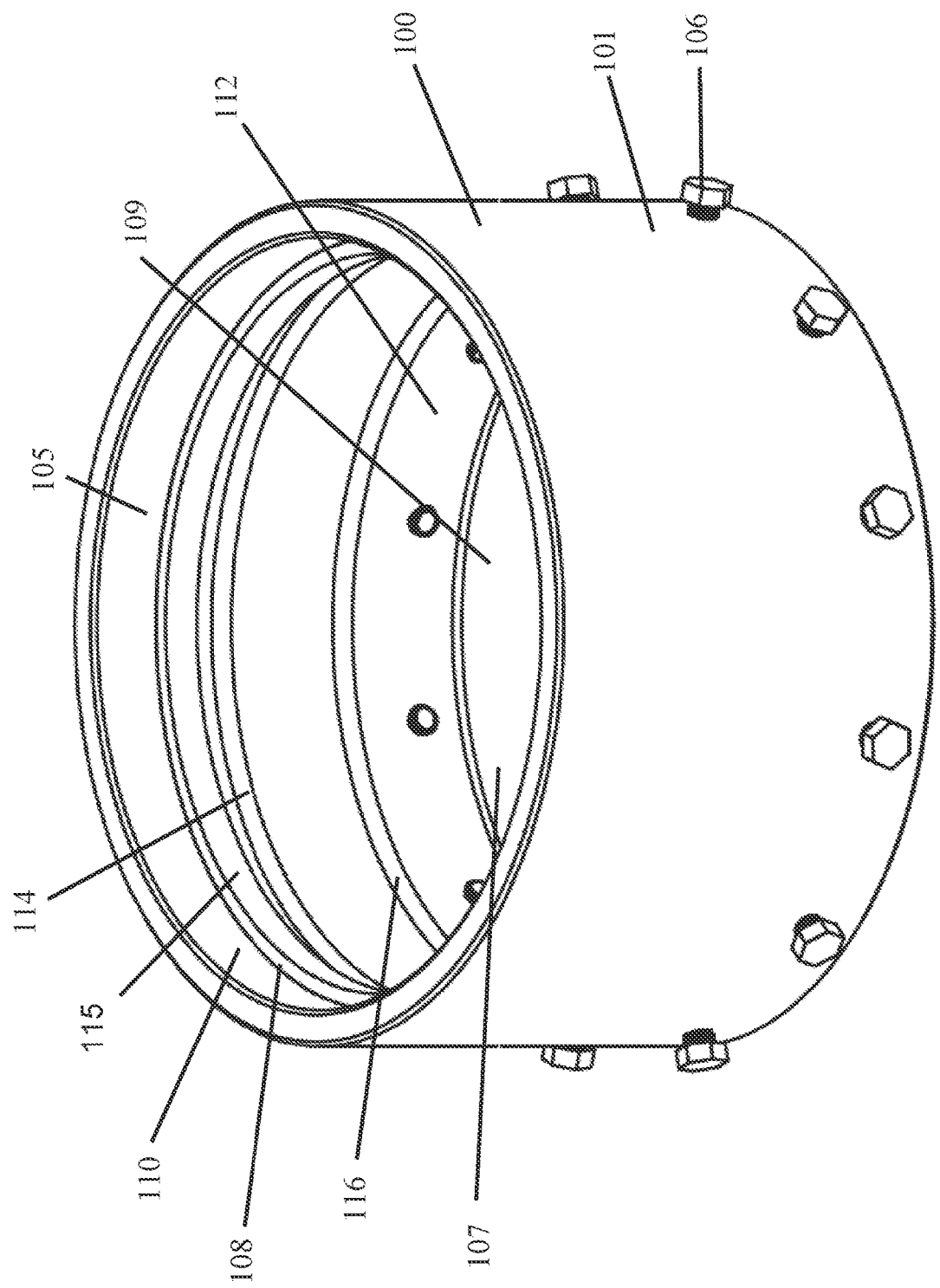
FIG. 3 is a perspective view of a connector body of one embodiment of the present invention.
Figure 5:
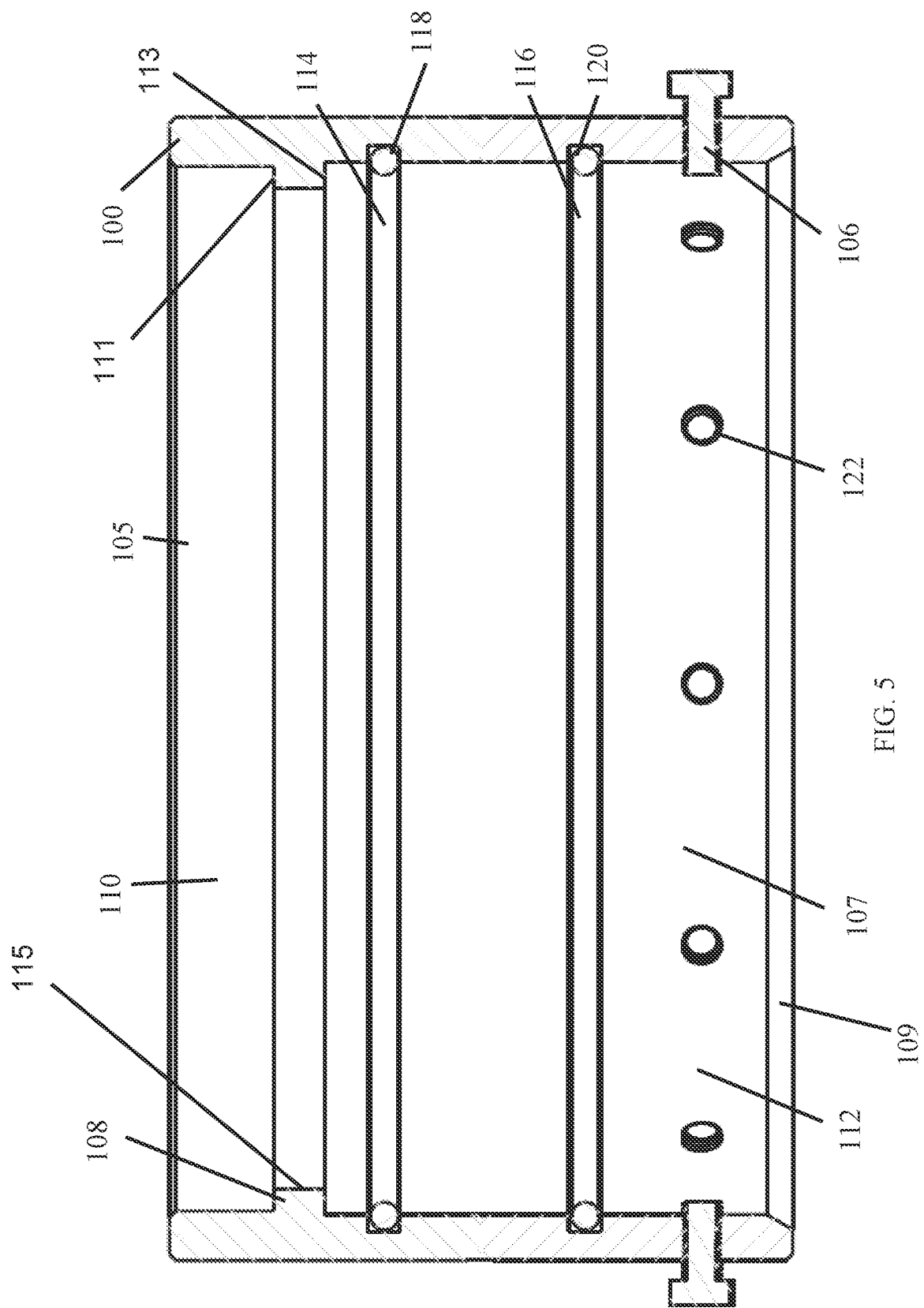
FIG. 5 is a sectional view thereof.
Figure 6:
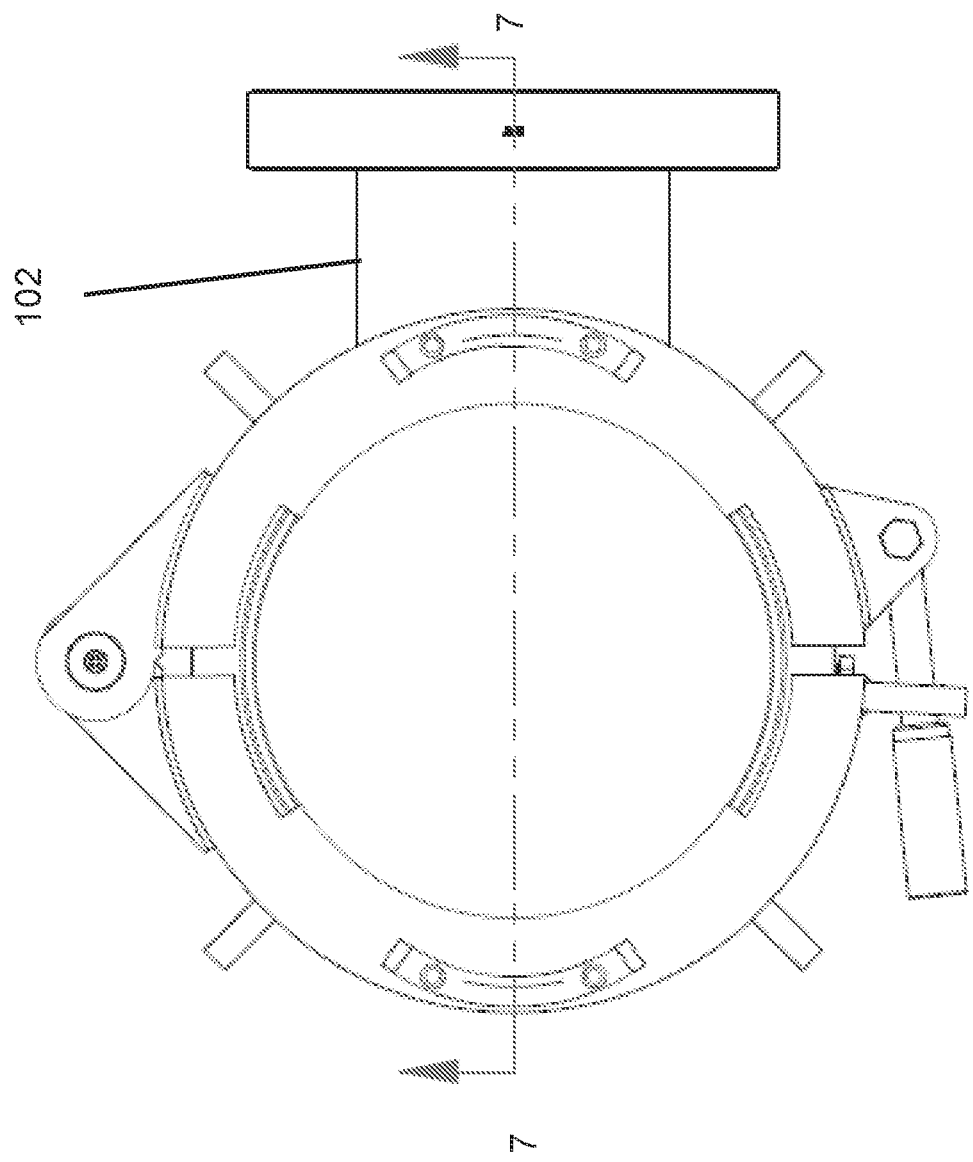
FIG. 6 is a top environmental view thereof.

FIG. 3 shows the connector body 100. The connector body 100 provides an attachment shoulder 108. The attachment shoulder 108 protrudes radially inward at inward surface 115 from the connector body 100 as shown in FIGS. 3 and 5. The attachment shoulder 108 reduces the diameter of the inner aperture 107 of connector body 100. Outer wall 101 defines the inner aperture 107. The most radially interior portion of the connector body 100 of one embodiment is located at the attachment shoulder 108. In one embodiment, the inner aperture 107 narrows at the attachment shoulder 108.

Figure 4:
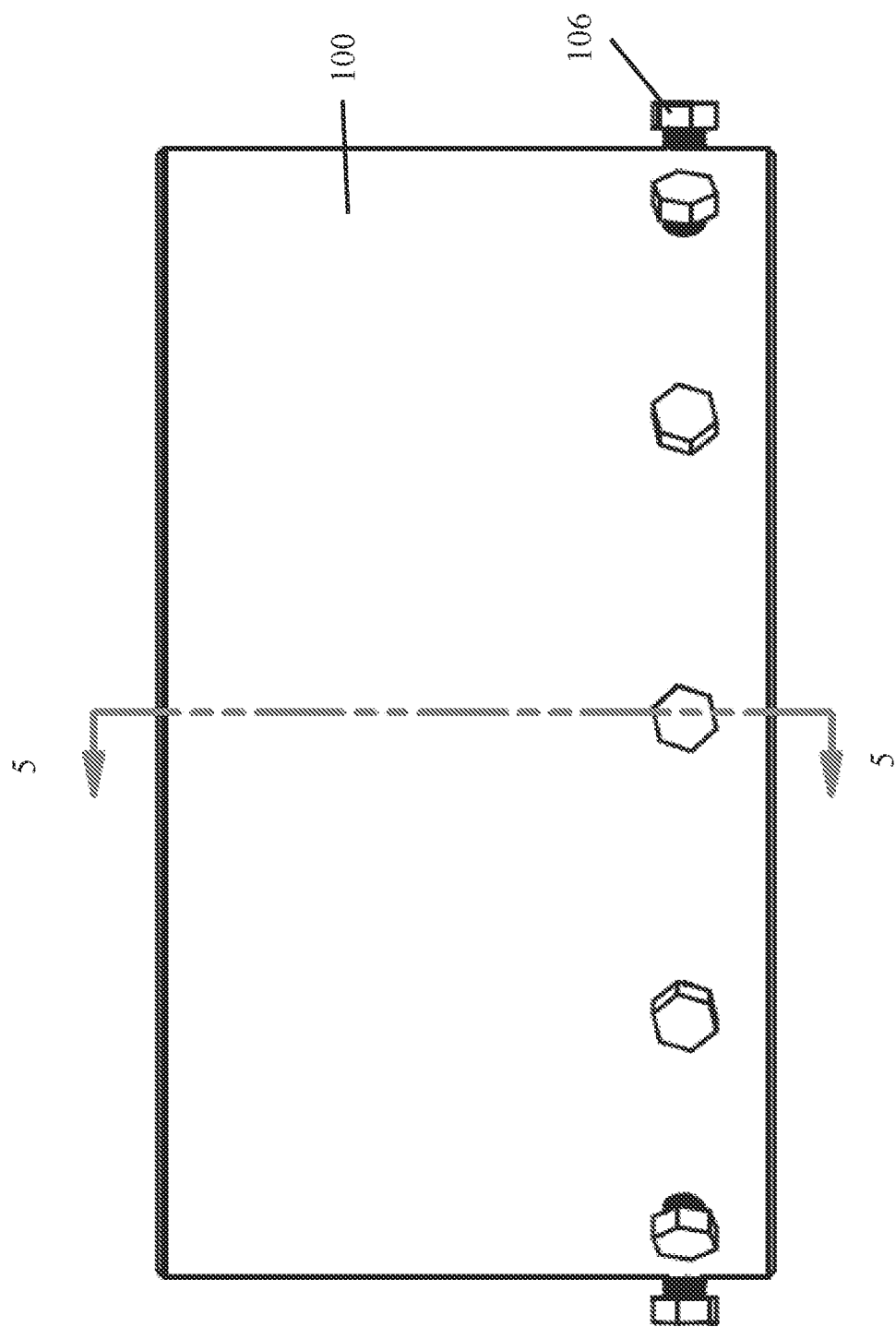
FIG. 4 is a front view thereof, the rear view, right side view, and left side view being a mirror image of the front view.

The attachment shoulder 108 separates the bowl from the conductor pipe as shown in FIGS. 3-5. The attachment shoulder 108 creates two different cavities within the connector body 100. The connector body 100 creates an upper section, bowl cavity 110, for placement of the bowl within the connector body 100 at upper opening 105. The connector body 100 also creates a lower section, pipe cavity 112, for placement of the conductor pipe within the connector body 100 at lower opening 109.

Sealing grooves 114, 116 located vertically below the attachment shoulder 108, within pipe cavity 112, provide a location for placing the seals. A seal, such as an O-ring seal, is placed within each sealing groove 114, 116. The seals create a seal between the interior surface of the connector body 100 and the exterior surface of the conductor pipe.

FIGS. 3 and 4 show the fasteners 106 within connector body 104. Fasteners 106, such as twelve (12) fasteners, are spaced circumferentially around the connector body 100. The fasteners insert into the fastener apertures located circumferentially around the connector body 100. In one embodiment, the fastener apertures are located below the seal cavities 114, 116.

The bowl inserts into the upper opening 105 of connector body 100 to bowl cavity 110 within the aperture 107. The bowl rests on the upper surface 111 of the attachment shoulder 108. FIG. 5 shows one embodiment of the present invention with a level upper surface 111 that extends perpendicularly inward from the outer wall 101.

The bowl inserts into the upper opening 105 of connector body 100 to bowl cavity 110 within the aperture 107. The bowl rests on the upper surface of the attachment shoulder 108.

FIG. 5 also shows the pipe cavity 112 located below the attachment shoulder 108. The conductor pipe inserts into the lower opening 109 of pipe cavity 112 to the lower surface 113 of the attachment shoulder 108. The lower surface 113 of the attachment shoulder 108 of one embodiment is flattened to extend perpendicularly inward from the outer wall 101. The conductor pipe fits within the aperture 107. The attachment shoulder 108 limits the insertion of the conductor pipe through the aperture 107. The attachment shoulder 108 restricts the conductor pipe from passing through the connector body 100 as shown in FIG. 7. The bowl of one embodiment is welded onto the connector body 100 at weld 98 as shown at FIG. 7.

The pipe cavity 112 provides two seal grooves 114, 116 for seals 118, 120. The seals 118, 120 contact the external surface of the conductor pipe. The seals 118, 120 restrict the flow of fluids through the connection at connector body 100 and conductor pipe.

The present invention also provides a method for installing a bowl on the conductor pipe and removing the bowl from the conductor pipe. The user simply places a bowl with a connector body attached onto the conductor pipe. The user installs the connector body over the conductor pipe such that the conductor pipe inserts into the connector body. The user then tightens the fasteners to adjust the fasteners radially inwards towards the conductor pipe. The fasteners contact the conductor pipe to secure the connector body to the conductor pipe. In one embodiment, the fasteners frictionally engage the conductor pipe. Such frictional engagement avoids the requirement of placing holes for insertion of the fasteners into the conductor pipe.

To release the bowl from the conductor pipe, the user simply loosens the fasteners. Loosening the fasteners withdraws the fasteners away from the conductor pipe. At least one of the fasteners will not contact the conductor pipe. The user can then remove the bowl from the conductor pipe.

The connector body may mate any sized bowl to any sized conductor pipe. For example, the connector body may be sized to secure a 16 inch bowl to a twenty inch conductor pipe or a twenty four inch conductor pipe. The connector body may be also sized to connect a twenty inch bowl to a twenty inch conductor pipe or a twenty four inch conductor pipe. The connector body may secure different sized bowls to different sized conductor pipes.

From the foregoing, it will be seen that the present invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A connecting device for securing a bowl to a conductor pipe in a drilling operation wherein the conductor pipe extends along a vertical axis for the flow of a drilling fluid vertically through the conductor pipe and through the bowl, wherein the bowl secures to the connecting device vertically above the conductor pipe, the device comprising:
   a connector body forming an outer wall;
   an upper opening of the connector body configured to accept insertion of the bowl into the upper opening of the connector body;
   a lower opening of the connector body located vertically below the upper opening;
   an inner aperture defined by the outer wall, wherein the inner aperture extends vertically from the upper opening downward to the lower opening;
   an attachment shoulder extending radially inward from the outer wall to decrease the diameter of the inner aperture at the attachment shoulder, wherein the diameter of the inner aperture at the attachment shoulder is less than the diameter of the inner aperture at the upper opening and the lower opening;
   at least one fastener aperture directed radially inward through the outer wall into the inner aperture, the at least one fastener aperture located vertically between the attachment shoulder and the lower opening;
   wherein a smallest diameter of the inner aperture above the attachment shoulder is the same as the smallest diameter of the inner aperture below the attachment shoulder;
   an inner surface of the connector body located interior of the outer wall;
   a seal groove located on the inner surface of the connector body, wherein the seal groove accepts a seal, wherein the seal groove is located vertically between the attachment shoulder and the at least one fastener aperture.

2. The device of claim 1, wherein the seal groove and the fastener aperture are located vertically below the attachment shoulder between the attachment shoulder and the lower opening.

3. The device of claim 1 further comprising:
   a weld that secures the connector body to the bowl, wherein the attachment shoulder is located vertically below the weld;

wherein the seal groove and the fastener aperture are located vertically below the attachment shoulder between the attachment shoulder and the lower opening; and wherein no seals are located vertically between the weld and the attachment shoulder.

4. A connecting device for securing a bowl to a conductor pipe in a drilling operation wherein the conductor pipe extends along a vertical axis for the flow of a drilling fluid vertically through the conductor pipe and through the bowl, wherein the bowl secures to the connecting device vertically above the conductor pipe, the device comprising:
- a connector body forming an outer wall;
- an upper opening of the connector body configured to accept insertion of the bowl into the upper opening of the connector body;
- a lower opening of the connector body located vertically below the upper opening;
- an inner aperture defined by the outer wall, wherein the inner aperture extends vertically from the upper opening downward to the lower opening;
- an attachment shoulder extending radially inward from the outer wall to decrease the diameter of the inner aperture at the attachment shoulder, wherein the diameter of the inner aperture at the attachment shoulder is less than the diameter of the inner aperture at the upper opening and the lower opening;
- at least one fastener aperture directed radially inward through the outer wall into the inner aperture, the at least one fastener aperture located vertically between the attachment shoulder and the lower opening;
- wherein a smallest diameter of the inner aperture above the attachment shoulder is the same as the smallest diameter of the inner aperture below the attachment shoulder;
- an upper surface of the attachment shoulder that extends radially inward from the outer wall, wherein the bowl contacts the upper surface of the attachment shoulder.

5. A connecting device for securing a bowl to a conductor pipe in a drilling operation wherein the conductor pipe extends along a vertical axis for the flow of a drilling fluid vertically through the conductor pipe and through the bowl, wherein the bowl secures to the connecting device vertically above the conductor pipe, the device comprising:
- a connector body forming an outer wall;
- an upper opening of the connector body configured to accept insertion of the bowl into the upper opening of the connector body;
- a lower opening of the connector body located vertically below the upper opening;
- an inner aperture defined by the outer wall, wherein the inner aperture extends vertically from the upper opening downward to the lower opening;
- an attachment shoulder extending radially inward from the outer wall to decrease the diameter of the inner aperture at the attachment shoulder, wherein the diameter of the inner aperture at the attachment shoulder is less than the diameter of the inner aperture at the upper opening and the lower opening;
- at least one fastener aperture directed radially inward through the outer wall into the inner aperture, the at least one fastener aperture located vertically between the attachment shoulder and the lower opening;
- wherein a smallest diameter of the inner aperture above the attachment shoulder is the same as the smallest diameter of the inner aperture below the attachment shoulder;
- a weld that secures the connector body to the bowl, wherein the attachment shoulder is located vertically below the weld.

6. The device of claim 5, wherein the conductor pipe inserts into the lower opening of the connector body, wherein the fastener secures the conductor pipe with the connector body vertically below the attachment shoulder and the bowl.

7. The device of claim 6, wherein the attachment shoulder restricts the conductor pipe from passing into the upper opening.

8. The device of claim 7 further comprising:
- the seal located vertically below the attachment shoulder and the weld.

9. A connecting device for securing a bowl to a conductor pipe in a drilling operation wherein the conductor pipe extends along a vertical axis for the flow of a drilling fluid vertically through the conductor pipe and through the bowl, wherein the bowl secures to the connecting device vertically above the conductor pipe, the device comprising:
- a connector body forming an outer wall;
- an upper opening of the connector body configured to accept insertion of the bowl;
- a lower opening of the connector body located vertically below the upper opening;
- an inner aperture defined by the outer wall, wherein the inner aperture extends vertically along the vertical axis from the upper opening downward to the lower opening;
- an attachment shoulder extending radially inward from the outer wall to decrease the diameter of the inner aperture at the attachment shoulder, wherein the diameter of the inner aperture at the attachment shoulder is less than the diameter of the inner aperture at the upper opening and the lower opening;
- at least one fastener aperture directed radially inward from through the outer wall into the inner aperture, wherein the at least one fastener aperture is located vertically between the attachment shoulder and the lower opening;
- the at least one fastener aperture configured to accept a fastener inserted radially into the inner aperture vertically between the attachment shoulder and the lower opening; and
- a seal groove located interior of the outer wall, wherein the seal groove accepts a seal, wherein the seal groove is located vertically between the attachment shoulder and the at least one fastener aperture;
- wherein a diameter of the inner aperture remains a constant size between the attachment shoulder and the at least one fastener aperture.

10. The device of claim 9, wherein the fastener radially enters the inner aperture vertically below the attachment shoulder to secure the conductor pipe inside the connector body below the attachment shoulder.

11. The device of claim 9, wherein no seals are positioned in the inner aperture vertically between the upper opening and the attachment shoulder.

12. The device of claim 11 further comprising:
- a second seal located vertically between the attachment shoulder and the at least one fastener aperture.

13. The device of claim 9 further comprising:
- a weld that secures the connector body to the bowl, wherein the weld is located vertically above the attachment shoulder and the seal;
- wherein the attachment shoulder extends perpendicularly inward from the outer wall, the attachment shoulder having an upper surface that extends perpendicular from the outer wall, the attachment shoulder having a lower surface that extends perpendicular from the outer wall, wherein the bowl contacts the upper surface of the attachment shoulder when the weld secures the connector body to the bowl.

14. The device of claim 13 wherein the attachment shoulder restricts the conductor pipe from passing above the attachment shoulder.

15. A connecting device for securing a bowl to a conductor pipe in a drilling operation wherein the conductor pipe extends along a vertical axis for the flow of a drilling fluid vertically through the conductor pipe and through the bowl, wherein the bowl secures to the connecting device vertically above the conductor pipe, the device comprising:
 a connector body forming an outer wall;
 an upper opening of the connector body wherein the bowl inserts into the upper opening of the connector body;
 a lower opening of the connector body located vertically below the upper opening;
 an inner aperture defined by the outer wall, wherein the inner aperture extends vertically along the vertical axis from the upper opening downward to the lower opening;
 an attachment shoulder extending radially inward from the outer wall to decrease the diameter of the inner aperture at the attachment shoulder, wherein the diameter of the inner aperture at the attachment shoulder is less than the diameter of the inner aperture at the upper opening and the lower opening;
 at least one fastener aperture directed radially inward through the outer wall into the inner aperture, the at least one fastener aperture located vertically between the attachment shoulder and the lower opening;
 an inner surface of the connector body located interior of the outer wall;
 a seal groove located on the inner surface of the connector body, wherein the seal groove accepts a seal, wherein the seal groove is located vertically below the attachment shoulder between the attachment shoulder and the lower opening;
 wherein the seal groove and the fastener aperture are located vertically below the attachment shoulder between the attachment shoulder and the lower opening;
 wherein a smallest diameter of the inner aperture above the attachment shoulder is the same as the smallest diameter of the inner aperture below the attachment shoulder;
 wherein the diameter of the inner aperture remains a constant size between the attachment shoulder and the at least one fastener aperture.

16. The device of claim 15, wherein no seals are positioned on the inner surface of the connector body above the attachment shoulder between the attachment shoulder and the upper opening.

17. The device of claim 15 further comprising:
 a weld securing the connector body to the bowl, wherein the bowl contacts the attachment shoulder.

18. The device of claim 17, wherein the seal groove and the fastener aperture are located vertically below the attachment shoulder between the attachment shoulder and the lower opening; and
 wherein the weld is located vertically above the upper opening, wherein no seals are located vertically above the attachment shoulder between the weld and the attachment shoulder.

19. The device of claim 18 further comprising:
 a second seal located vertically below the attachment shoulder between the attachment shoulder and the at least one fastener aperture.

* * * * *